(12) United States Patent
Rosenkranz et al.

(10) Patent No.: US 11,656,927 B1
(45) Date of Patent: May 23, 2023

(54) LOCALIZING FAULTS IN MULTI-VARIATE TIME SERIES DATA

(71) Applicant: International Business Machines Corporation, Armonk, NY (US)

(72) Inventors: Joshua M Rosenkranz, White Plains, NY (US); Pranita Sharad Dewan, New York, NY (US); Mudhakar Srivatsa, White Plains, NY (US); Praveen Jayachandran, Bangalore (IN); Chander Govindarajan, Chennai (IN); Priyanka Prakash Naik, Mumbai (IN); Kavya Govindarajan, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/541,453

(22) Filed: Dec. 3, 2021

(51) Int. Cl.
*G06F 11/07* (2006.01)
(52) U.S. Cl.
CPC .......... *G06F 11/076* (2013.01); *G06F 11/079* (2013.01); *G06F 11/0709* (2013.01)
(58) Field of Classification Search
CPC ... G06F 11/076; G06F 11/0709; G06F 11/079
See application file for complete search history.

(56) References Cited

U.S. PATENT DOCUMENTS

| 6,785,663 | B2 | 8/2004 | Wang et al. |
| 8,972,308 | B2 | 3/2015 | Hao et al. |
| 9,833,196 | B2 | 12/2017 | Sarrafzadeh et al. |
| 10,176,246 | B2 | 1/2019 | Dang et al. |
| 10,288,653 | B2 | 5/2019 | Agarwal et al. |
| 11,010,233 | B1* | 5/2021 | Golden .................. G06N 3/047 |
| 2017/0060664 | A1 | 3/2017 | Shin et al. |
| 2017/0206470 | A1 | 7/2017 | Marculescu et al. |
| 2019/0286506 | A1* | 9/2019 | Cheng .................. H04L 67/125 |

(Continued)

FOREIGN PATENT DOCUMENTS

WO 2021126512 A1 6/2021

OTHER PUBLICATIONS

NIST, "NIST Cloud Computing Program", http://csrc.nist.gov/groups/SNS/cloud-computing/index.html, Created Dec. 1, 2016, Updated Oct. 6, 2017, 9 pages.

(Continued)

*Primary Examiner* — Matthew M Kim
*Assistant Examiner* — Kyle Emanuele
(74) *Attorney, Agent, or Firm* — Scully, Scott, Murphy & Presser, P.C.; Anthony Mauricio Pallone (57) ABSTRACT

An ensemble of autoencoder models can be trained using different seeds. The trained ensemble of autoencoder models can be run on new time series data to generate a prediction associated with the new time series data. The new time series data can include multiple dimensions per time step. Reconstruction errors can be determined for the prediction. Dimensions having highest reconstruction errors can be selected among the multiple dimensions based on a threshold. The prediction can be segmented based on bursts of the reconstruction errors over time, where temporal segments can be obtained. At least one common pattern including a set of dimensions among the selected dimensions across the temporal segments can be obtained to represent a failure fingerprint.

20 Claims, 8 Drawing Sheets

(56) References Cited

U.S. PATENT DOCUMENTS

2020/0210873 A1    7/2020  Cantwell
2022/0179406 A1*  6/2022  Zope .................. G05B 23/0221
2022/0318624 A1*  10/2022  Natsumeda ............. G06F 18/25

OTHER PUBLICATIONS

Choi, K., et al., "Deep Learning for Anomaly Detection in Time-Series Data: Review, Analysis, and Guidelines", IEEE Access, Received Aug. 6, 2021, Accepted Aug. 23, 2021, Date of Publication Aug. 26, 2021, Date of Current Version Sep. 7, 2021, p. 120043-120065, vol. 9.

Xiao, Q., et al., "Memory-augmented Adversarial Autoencoders for Multivariate Time-series Anomaly Detection with Deep Reconstruction and Prediction", arXiv:2110.08306v1 [cs.LG], Oct. 15, 2021, 10 pages.

Zhang, Y., et al., "Unsupervised Deep Anomaly Detection for Multi-Sensor Time-Series Signals", arXiv:2107.12626v1 [cs AI], Jul. 27, 2021, 14 pages.

International Search Report and Written Opinion issued in PCT/EP2022/077834 dated Feb. 10, 2023, 14 pages.

\* cited by examiner

LOCALIZING FAULTS IN MULTI-VARIATE TIME SERIES DATA

STATEMENT REGARDING FEDERALLY SPONSORED RESEARCH OR DEVELOPMENT

This invention was made with Government support under W911NF-16-3-0001 awarded by the Army Research Office (ARO). The Government has certain rights to this invention.

BACKGROUND

The present application relates generally to computers and computer applications, and more particularly to machine learning, prediction models, and anomaly detection.

Spatiotemporal patterns indicating interesting events or anomalies often occur in a variety of domains such as in large scale distributed systems, traffic modeling, manufacturing systems, and/or others. These patterns if captured properly may be used to detect and resolve any existing problems as well as prevent potential problems. Current techniques to capture such patterns make use of techniques such as cross correlation among the entities involved. Cross correlation is a quadratic time operation (in the number of entities present), which can be inefficient, for example, when dealing with a large number of entities.

BRIEF SUMMARY

The summary of the disclosure is given to aid understanding of a computer system and method of capturing spatiotemporal patterns in multi-variate timeseries data, and not with an intent to limit the disclosure or the invention. It should be understood that various aspects and features of the disclosure may advantageously be used separately in some instances, or in combination with other aspects and features of the disclosure in other instances. Accordingly, variations and modifications may be made to the computer system and/or their method of operation to achieve different effects.

A computer-implemented method, in an aspect, can include training an ensemble of autoencoder models using different seeds. The method can also include running the trained ensemble of autoencoder models on new time series data to generate a prediction associated with the new time series data, the new time series data including multiple dimensions per time step. The method can also include determining reconstruction errors for the prediction. The method can also include selecting dimensions having highest reconstruction errors among the multiple dimensions based on a threshold. The method can also include segmenting the prediction based on bursts of the reconstruction errors over time, where temporal segments are obtained. The method can also include identifying at least one common pattern including a set of dimensions among the selected dimensions across the temporal segments.

A computer-implemented method, in an aspect, can include training an ensemble of autoencoder models using different seeds. The method can also include running the trained ensemble of autoencoder models on new time series data to generate a prediction associated with the new time series data, the new time series data including multiple dimensions per time step. The method can also include determining reconstruction errors for the prediction. The method can also include selecting dimensions having highest reconstruction errors among the multiple dimensions based on a threshold. The method can also include segmenting the prediction based on bursts of the reconstruction errors over time, where temporal segments are obtained. The method can also include identifying at least one common pattern including a set of dimensions among the selected dimensions across the temporal segments. At least one common pattern identified can represent a failure fingerprint. The method can also include automatically restarting a router based on the identified failure fingerprint.

A computer-implemented method, in an aspect, can include training an ensemble of autoencoder models using different seeds. The method can also include running the trained ensemble of autoencoder models on new time series data to generate a prediction associated with the new time series data, the new time series data including multiple dimensions per time step. The method can also include determining reconstruction errors for the prediction. The method can also include selecting dimensions having highest reconstruction errors among the multiple dimensions based on a threshold. The method can also include segmenting the prediction based on bursts of the reconstruction errors over time, where temporal segments are obtained. The method can also include identifying at least one common pattern including a set of dimensions among the selected dimensions across the temporal segments. At least one common pattern identified can represent a failure fingerprint. The method can also include automatically adjusting heap space of a virtual machine based on the identified failure fingerprint.

A system in an aspect can include a processor. The system can also include a memory device coupled with the processor. The processor can be configured to train an ensemble of autoencoder models using different seeds. The processor can also be configured to run the trained ensemble of autoencoder models on new time series data to generate a prediction associated with the new time series data. The new time series data can include multiple dimensions per time step. The processor can also be configured to determine reconstruction errors for the prediction. The processor can also be configured to select dimensions having highest reconstruction errors among the multiple dimensions based on a threshold. The processor can also be configured to segment the prediction based on bursts of the reconstruction errors over time, where temporal segments are obtained. The processor can also be configured to identify at least one common pattern including a set of dimensions among the selected dimensions across the temporal segments.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

In one or more embodiments, a system and/or method of ensemble autoencoders can be provided. In one or more embodiment, the ensemble of autoencoders can capture multiple equivalent networks for root cause analysis and failure fingerprinting. In one or more embodiments, the system and/or method can localize faults in multi-variate timeseries data, e.g., using unsupervised techniques by capturing spatiotemporal patterns in multi-variate timeseries. The system and/or method can train autoencoder models over the data of interest and capture interesting patterns by examining the reconstruction loss or error from the models. For example, an ensemble of autoencoder models can be trained with different seeds, where the autoencoder models capture spatial correlation. The system and/or method can, using the trained models make predictions on the new data of interest, and compute the reconstruction errors between the predictions and the ground truth data. The system and/or method can obtain the top-k highest reconstruction error dimensions, e.g., perform a burst based segmentation on the timeseries to obtain temporal segments that have a high reconstruction error (e.g., top k, where k is a configurable figure), and perform frequent itemset discovery on the temporal segments, treating each burst segment as an itemset. For example, using techniques such as Frequent Pattern (FP)-Growth, the frequent patterns can be obtained and considered as the distinguishing spatiotemporal patterns.

In an embodiment, one or more unsupervised techniques can be provided to capture spatiotemporal patterns in multivariate timeseries data. In an embodiment, the techniques work by training autoencoder models over the data of interest and capturing interesting patterns
by examining the reconstruction loss or error from the models. The techniques disclosed herein can allow for eliminating the highly expensive cross correlation step in the online or offline detection stage (e.g., $O(N^2)$), making it more efficient and feasible for computer implementation and usage in real world applications. For instance, computer's computation power needed to perform anomaly detection can be reduced.

Figure 1:
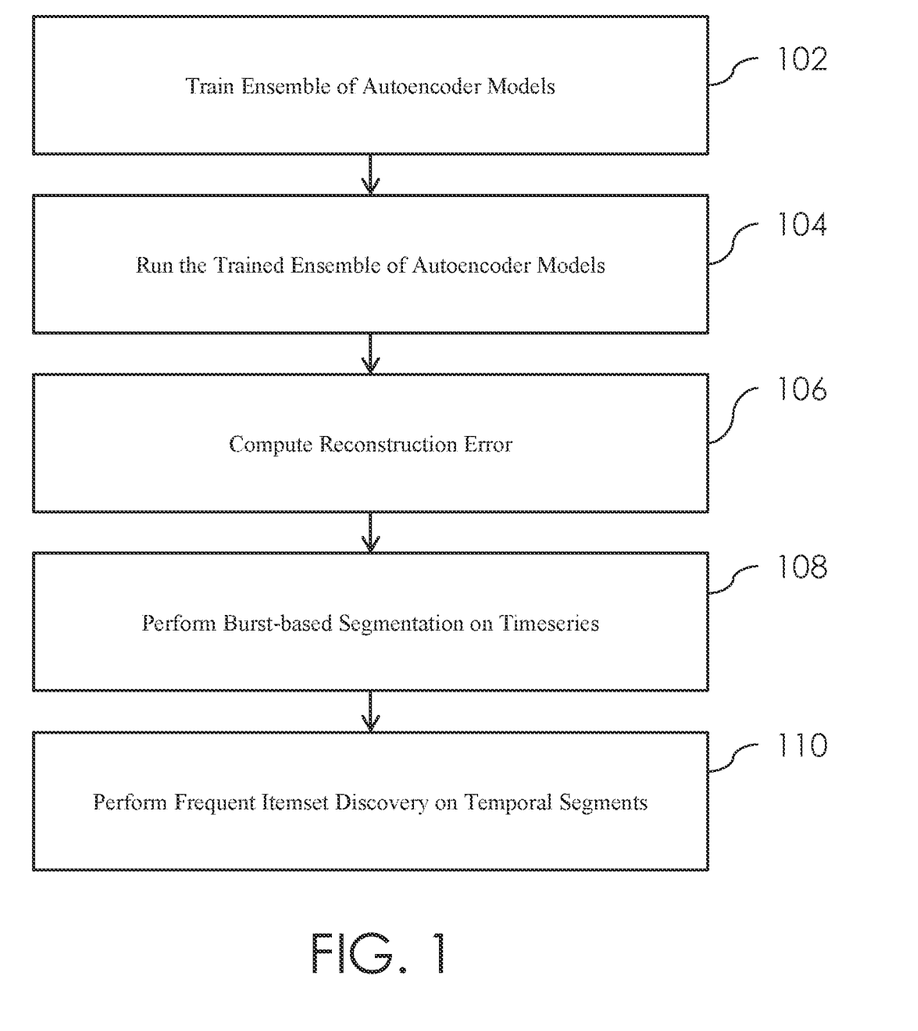
FIG. 1 is a flow diagram illustrating a method of discovering spatiotemporal patterns in multivariate timeseries data in an embodiment.

FIG. 1 is a flow diagram illustrating a method of discovering spatiotemporal patterns in multivariate timeseries data in an embodiment. The method can be implemented and/or run on one or more computer processors, for example, including one or more hardware processors. One or more hardware processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors.

A processor may be a central processing unit (CPU), a graphics processing unit (GPU), a field programmable gate array (FPGA), an application specific integrated circuit (ASIC), another suitable processing component or device, or one or more combinations thereof. The processor may be coupled with a memory device. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium.

At 102, an ensemble of autoencoder models can be trained, e.g., using different seeds. The autoencoder models can capture spatial correlation. For example, an autoencoder in the ensemble is trained using a set of seeds that is different from one that is used in training another autoencoder in the ensemble. Training multiple models with different seeds can help capture multiple equivalent network instantiations. Such multiple equivalent network instantiations can be used to perform a root cause diagnosis. In an embodiment, the autoencoder models have the same architecture, but trained with different seeds or different initial weights. In an embodiment, different seeds can be selected randomly, e.g., using a random number generator. In another embodiment, different seeds can be configured by a user such as a subject matter expert.

Briefly, an autoencoder is a form of artificial neural network. An autoencoder provides a form of unsupervised learning, where the autoencoder can learn encodings of unlabeled data. The encodings can be validated and improved by trying to regenerate the input from the encoding. An autoencoder can have an encoder part that maps the input into an encoding, and a decoder part that maps the encoding to a reconstruction of the input. The encoder part learns to reduce the input dimensions and compress the input data into an encoded representation. The decoder learns to reconstruct the input data from the encoded representation, for example, to be as close to the input data (original input data). An encoder also can include a hidden layer (a bottleneck layer) that stores or includes the compressed representation of the input data. A reconstruction error or loss measures how well the decoder is performing in reconstructing the input data, for example, how close the output is to the original input data. Autoencoder architecture can include, but not limited to, a feed forward network, a long term short term memory (LSTM), Convolutional Neural Network, and or others.

In an embodiment, metrics gathered from an operational system can be used as training data to train the ensemble of autoencoders. The training data can include one observation per time step (standard interpolation techniques can be used to ensure that observations are available at each time step). Each observation can include a 1×n (1 by n) vector of metrics. In an embodiment, the autoencoders are trained only on normal data (e.g., non-anomalous data). In an aspect, not needing to rely on having anomalous data as part of the training data can provide an advantage in machine learning. In an embodiment, in fingerprinting, anomalous data can used. This dataset can be relatively much smaller in size to the normal data.

At 104, once the models have been trained, the models can be run for predictions on the new data of interest. The new data of interest includes times series data. For example, using new time series data of interest as input data, the models can be run. For instance, the trained ensemble of autoencoder models can be run on new time series data to generate a prediction associated with the new time series data, where the new time series data includes multiple dimensions per time step. In an embodiment, the new data of interest can include anomalous data. The models produce output data or predictions, e.g., each model generates an output reconstruction of the new time series data. By way of example, the new time series data can include, but not limited to, sensor data observed in manufacturing equipment. By way of another example, the new time series data can include, but not limited to, performance data associated with computer components such as memory, processor, network device, and/or another.

At 106, the reconstruction error can be computed for the predictions (e.g., reconstructions) performed at 104. For example, reconstruction loss or error can be determined or computed associated with the generated reconstruction during the running of the models. The autoencoder is self-supervised, performs unsupervised learning. For example, an auto-encoder learns an identity function f(x)=x by encoding (compressing) x and decoding it back to an approximate reconstruction of x. For instance, "ground truth" can be the data itself (e.g., no external labels). The autoencoder attempts to minimize $\|f(x)-x\|$, which is the reconstruction error. Upon training, a good autoencoder will have low reconstruction error. If the testing data y has similar characteristics as the training data then $\|f(y)-y\|$ will have similar reconstruction error (i.e., low error) as the training. Upon encountering anomalies $\|f(y)-y\|$ will be relatively larger, indicating an anomaly.

In an embodiment, the top-k highest reconstruction error dimensions can be obtained. For example, dimensions having highest reconstruction errors among the multiple dimensions can be selected based on a threshold. For example, this can result in a timeseries of the form, <ts, reconstruction_error, top_k dims>, where "ts" represents timestamp or time, "reconstruction_error" is an error value, and "top_k dims" is top_k dimensions having reconstruction error, e.g., highest reconstruction error. In an embodiment, k can be a percentage value, e.g., k % of reconstruction error. "k" can be preset or preconfigured, and/or configurable, for example, by a subject matter expert. For example, if there are n dimensions, the reconstruction error r can be $r_1+ \ldots +r_n$, where $r_i$ is the reconstruction error in dimension i. In an embodiment, a processor may sort $r_i$ in descending order (high error to low error) and include the top-m dimensions $i_1, \ldots, i_m$ such that $ri_1++r_m >= k*r$. For example, the processor can pick dimensions such that 90% (k=0.9) error is covered.

At 108, a burst-based segmentation on the timeseries output generated at 106 can be performed to obtain temporal segments that have a high reconstruction error. For example, the prediction or output reconstruction of the new time series data can be segmented based on bursts of the reconstruction errors over time.

At 110, frequent itemset discovery on the temporal segments can be performed, where each burst segment is treated as an itemset. For instance, a technique such as Frequent Pattern (FP)-Growth algorithm can be used to discover one or more frequent itemsets. Other one or more techniques can be used. In an embodiment, the frequent patterns obtained can be considered as the distinguishing spatiotemporal patterns. Such spatiotemporal patterns can identify or fingerprint anomalies or failures. For example, at least one common pattern including a set of dimensions among the selected dimensions across the temporal segments can be identified, where the identified at least one common pattern represents a failure fingerprint. In an embodiment, a root cause analysis can be provided based on the failure fingerprint.

In an aspect, once fingerprint failure is identified, an action can be taken, for example, automatically such as restarting a router or another machine or equipment, for example, to fix the failure. Another example application of fixing the identified failure fingerprint can be increasing the heap space of a JAVA virtual machine. For example, once the kind or type of failure is identified, an automatic action related to the failure can be taken.

The system and/or method can identify spatiotemporal patterns in multivariate time series. Multivariate time series or multivariate time series data can have the following form: Data: $<ts, m_1, m_2, \ldots, m_n>^N$. "ts" represent time, e.g., timestamp, N is the number of dimensions, $m_1, m_2, \ldots, m_n$ represent variables in different dimensions, e.g., N dimensions. For example, at each time step or timestamp, there can be multiple different variables of different dimensions. By way of example, if the data is related to computer system performance data, one variable (e.g., $m_1$ can represent memory usage, $m_2$ can represent central processing unit (CPU) usage, $m_3$ can represent the number of applications currently running on the computer system, and so on). Time series can pertain to any type of data such as sensor data from equipment, manufacturing systems or plants, computer performance data, marketing data such as sales data, and/or others. In an aspect, there can be many time series data, e.g., a collection of hundreds or thousands of time series dimensions or variables, which can be detected or received together per timestamp, for example, which can be used to predict those time series in the future. In addition, such time series can be used to identify a fingerprint of a failure or anomaly in a subset of input time series. For instance, considering that there may be 100 times series per timestamp, a system and/or method in an embodiment can identify or fingerprint time series dimensions, which can be indicative of possible impending problem. Fingerprinting, e.g., includes discovering patterns from multivariate time series, time series having multiple variables in multiple dimensions. In an aspect, the system and/or method may allow for reducing the amount of monitoring and scaling up operations to millions of metrics (multivariate data) by identifying a succinct fingerprint.

In an aspect, time series data can be metric time series and/or categorical time series. For example, time series data can be represented with timestamp and n measurements, which are observations at one time step (or timestamp). There can be N such observations at each time step, and hence n measurements. These measurements can be metrics and/or categories, representing two different types of measurements. For instance, the metrics type can include continuous numbers, e.g., having a notion of x is less than y, y is less than z. The categories type includes data such as apple, orange, banana, e.g., those that do not have direct numeric relationship such as less than or greater than relationship between them (e.g., unless they are converted to some metrics data). There can also be conformal and non-conforming data. Conformal data refers to a well-behaved data, where there are no anomalies. Non-conformal data can be data that includes some anomaly, portions of anomalies, for example, there can be a 5 minute window in a one hour data set, which is anomalous. The system and/or method in an embodiment can capture patterns in time series data and use them to detect or indicate an impending anomaly. In an embodiment, the system and/or method can reduce the computation, for example, which may apply cross correlations (e.g., $O(N^2)$) in the number of data points both online and offline, which tend to be more expensive. For example, spatiotemporal patterns may be captured without incurring $O(N^2)$ online step, in comparisons in the input. Such methodology can reduce computer processor or processing power needed for anomaly detection, pattern detection, providing savings in computer resources.

Figure 2:
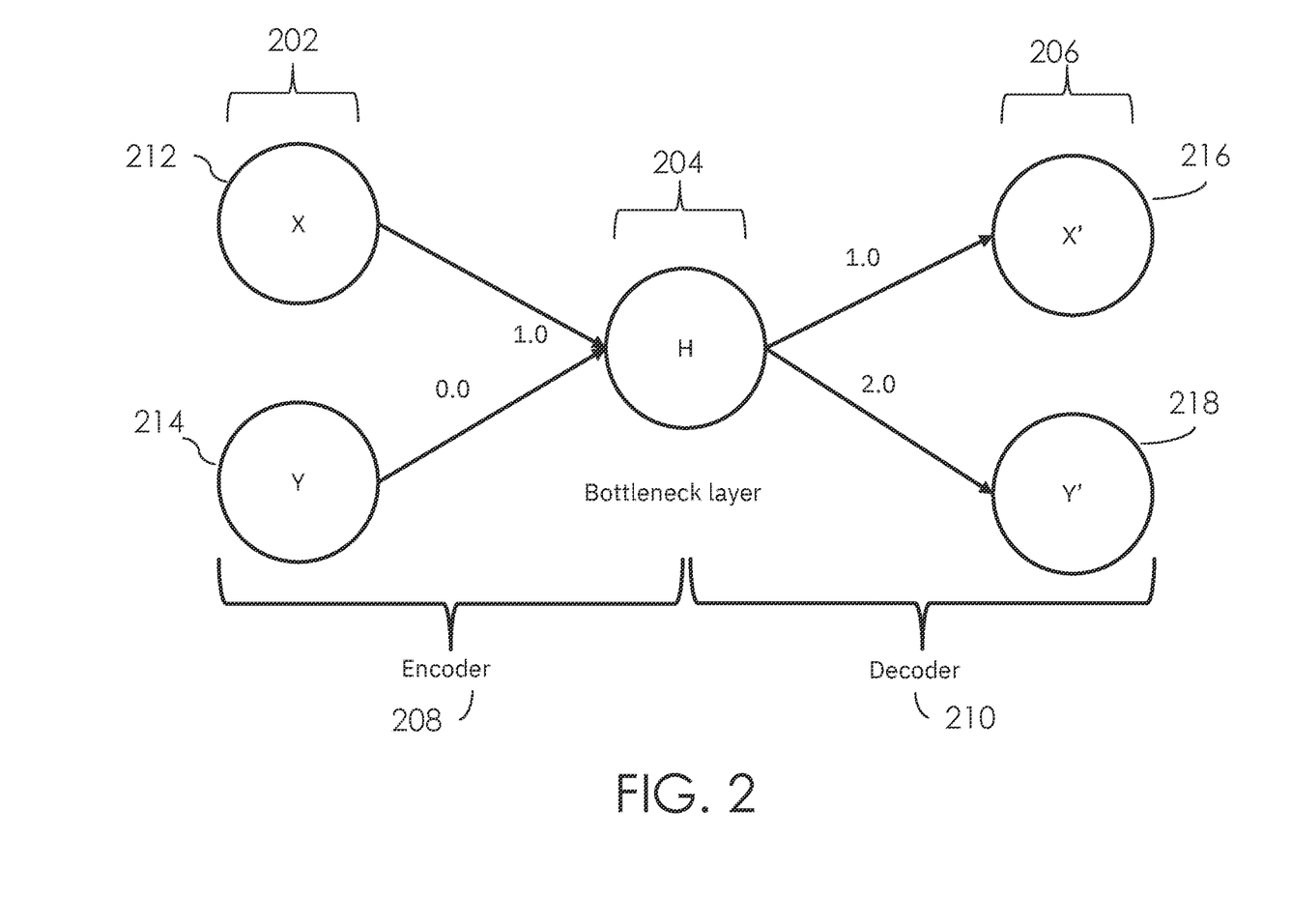
FIG. 2 is a diagram illustrating an example autoencoder in an embodiment.

Referring to the example time series, $<ts, m_1, m_2, \ldots, m_n>^N$, $m_1$ can have multiple values at different timestamps. Consider that one is interested in predicting $m_1$ for the future. Consider that $m_2$ also has values over a series of time steps. Performing all pair comparison between them ($m_1$ and $m_2$) in order to learn the pattern can become too expensive in terms of computer resources. In one or more embodiments, the system and/or method use autoencoders, a form of neural network to capture spatial patterns. FIG. 2 is a diagram illustrating an example autoencoder in an embodiment. By way of example, and for simplicity of explanation, the figure shows a time series which has two dimensions X and Y. Consider by way of example also that X and Y have a relationship such as $Y=2X+\varepsilon$, where $\varepsilon \sim N(0, \sigma^2)$ as ground truth. Epsilon ($\varepsilon$) represents a noise factor. For example, epsilon can be generated from a Gaussian distribution with a mean of zero and variance of Sigma squared ($\sigma^2$).

The autoencoder can train a bottleneck layer (H), also referred to as hidden layer, 204. The bottleneck layer (H) 204 in an embodiment has fewer nodes than the input layer 202. For instance, if there are 10 time series dimensions in the input layer, H can have less than 10 nodes (e.g., 5 or 4 or another smaller than 10). The autoencoder can have two components, encoder part 208 and a decoder part 210. An encoder part 208 encodes the input 202 to the bottleneck layer 204, for example, performs an operation which may compress the input 202. A decoder part 210 reconstructs the original input from the compressed form in the bottleneck layer H 204, e.g., generates reconstructed X (X prime) and the reconstructed Y (Y prime) from the hidden layer H 204. In this simple example, if Y were indeed equal to 2X (2 times X, times or multiplication operator is also denoted as '*' here), the hidden layer H 204 learns that H 204 is equal to 1.0*X+0*y, 1.0 and 0 being the parameters or weights learned by H 204. In this example case, H 204 is equal to X 212. The decoder 210 reconstructs X, say X prime 216, as 1.0*H. In this example, X prime 216 computes to H since H=1.0*X and X prime 216 is 1.0*H. In this example case also, X prime 216 is being reconstructed with zero error, whereas Y prime 218 is reconstructed as 2*H, which 2*X. Briefly, using this example, H 204 can be computed as the inputs multiplied by their weights and summed together. For example, 1.0*X+0*Y. In this example, H is equal to X. The weights of the autoencoder are trained. Continuing with the example, X prime 216 is 1.0*H, and since H is 1*X, X prime 216 is equal to X 212. On the other hand, Y prime 218 is 2*H, which is 2*(1*X) and therefore 2*X. Y 214, however, has an error, which is Epsilon. In this example, the decoder reconstructed Y prime 218 as 2*X, when real Y 214 could be 2*X plus some Epsilon. Hence, there is an error in the reconstruction.

Consider that this is the normal correlation pattern between X and Y, but during an anomaly it is observed that Y shifts to Y=4*X. If the same network (autoencoder) is used, Y prime will be reconstructed as 2*X, but in real observation, Y is 4*X. In this case, there is a high reconstruction error for Y. In an embodiment, N squared cross relation computations need not be done since the weights are trained by the network. In an embodiment, the relationship can be non-linear, e.g., a non-linear function. With the autoencoder network, non-linear relationships can be captured.

In an aspect, a fingerprint failure may not be the same as a root cause. For instance, in the case where Y shifts, X 212 may not have analytical reconstruction since X prime 216 would always equal to X, whereas Y prime 218 which is equal to 2*X would have high reconstruction error. In this example case, this autoencoder so trained may detect errors only in Y prime 218 and not in X prime 216.

Figure 3:
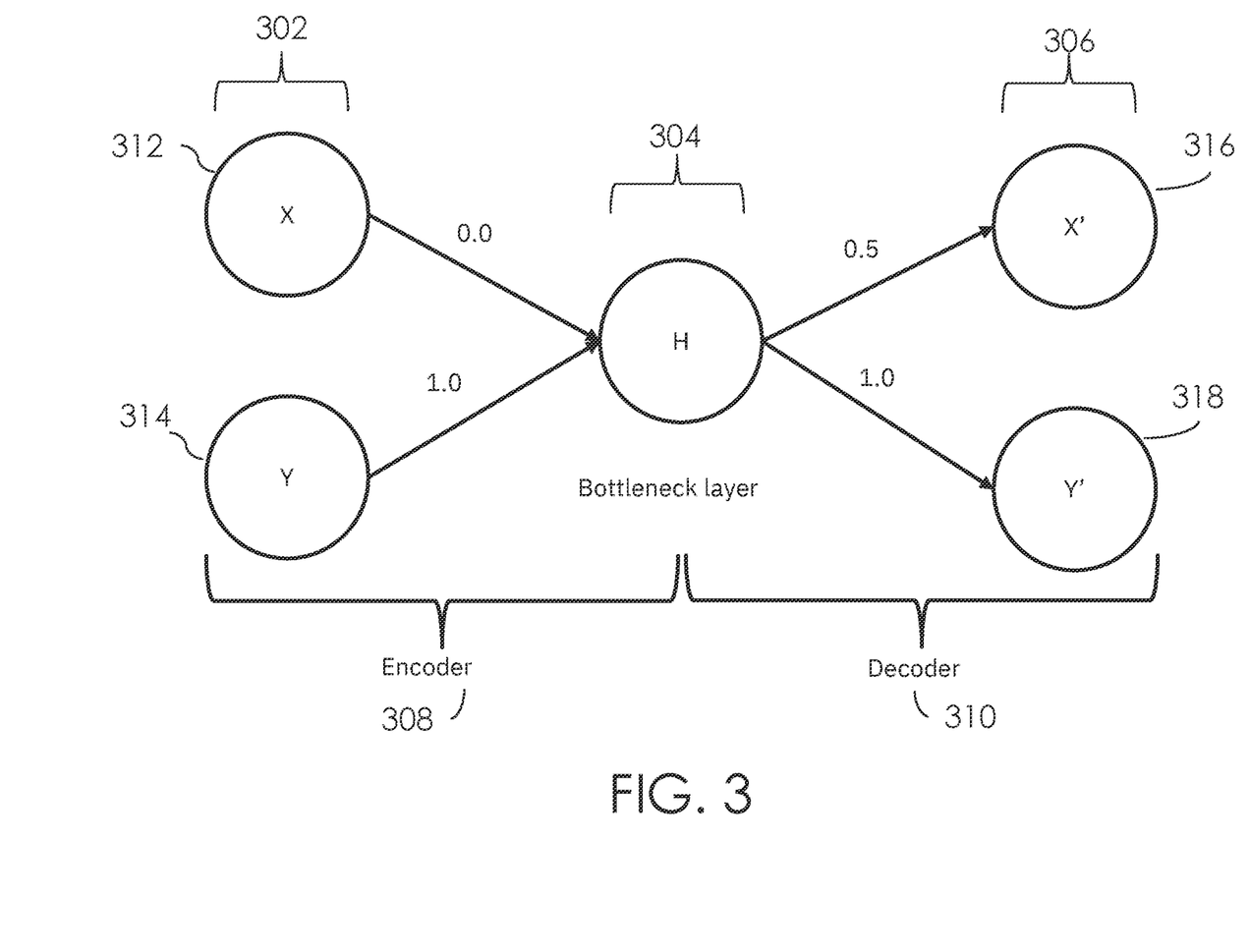
FIG. 3 is a diagram illustrating another autoencoder in an embodiment.

In an aspect, there can be another autoencoder, which has the same structure, architecture or topology, which can learn different weights on same give input data, for example, if trained with different seeds (or different initial weights). FIG. 3 is a diagram illustrating another autoencoder in an embodiment. In this figure, the hidden layer H 304 is equivalent to or equal Y 312, instead of being equal to X (as in the autoencoder in shown FIG. 2); X prime 316 is reconstructed as H 312 multiplied by 0.5, and Y prime 318 is equal to H 304. Under the same kind of abnormality discussed above (e.g., normal correlation (spatial pattern) where $Y=2*X+\varepsilon$; and on observing an abnormal correlation, where $Y=4*X+\varepsilon$), in this autoencoder, X prime 316 would have high reconstruction error but Y prime 318 would not have high reconstruction error. Based on the results of the two autoencoders, although the networks can fingerprint failure modality, root cause may not be conclusively attributed to only X or only Y.

In an aspect, the two networks are logically equivalent because on the normal correlation pattern, both networks perform identically. On normal correlation pattern or normal data, the error would be the same for both networks, which have different set of weights. On abnormal or anomalous data, however, the networks would produce different reconstruction errors, e.g., the first network would reconstruct Y prime with high reconstruction error but no X prime reconstruction error, the second network would reconstruct X prime with high reconstruction error and low X prime reconstruction error.

Figure 4:
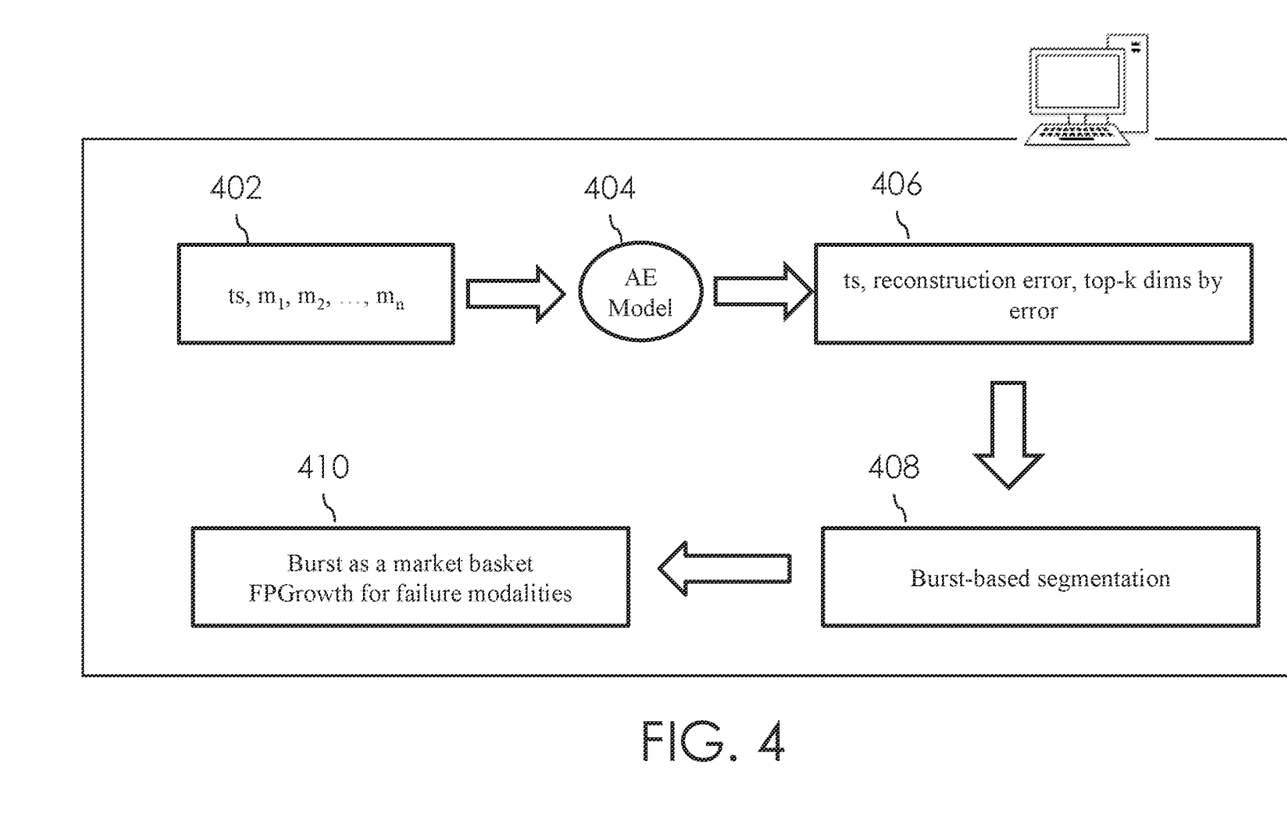
FIG. 4 is a diagram illustrating a system or method flow in an embodiment.

In an embodiment, the system and/or method may provide multiple equivalent networks, e.g., an ensemble of autoencoders to identify the root cause. FIG. 4 is a diagram illustrating a system or method flow in an embodiment. Time series data 402 can be input to trained ensemble of autoencoders 404. The autoencoders 404 make predictions on the dimensions of the time series data. At 406, reconstruction errors can be computed for each of the predicted dimensions. In an embodiment, top k dimensions can be identified, which have reconstruction errors. For example, out of all dimensions having reconstruction errors, top k dimensions or dimensions that have top k percentage of reconstruction error can be identified.

At 408, a burst based segmentation can be performed over time. For example, time segments or regions can be segmented according to where reconstruction errors appear, e.g., time regions of anomaly where reconstruction error is high. For example, reconstruction error data in time series can be segmented based on bursts of high reconstruction error.

At 410, within each burst, a failure modality can be identified or fingerprinted, e.g., by observing which dimensions are the ones that are experiencing high reconstruction error, thus fingerprinting the failure. Once the failure is fingerprinted then an automatic action can be triggered when that fingerprint is observed.

In an embodiment, each burst can be treated using, for example, a market basket analysis, for example, using a classical Frequent Pattern (FP)-growth algorithm. FP-growth algorithm learns association rules between different items. For example, one burst segmentation may have time series data A, B and C with reconstruction error, another segment may have time series data D, E, F with reconstruction error. There can be multiple such baskets or multiple bursts, and each bursts can have a subset of time series data with reconstruction error. Frequent itemsets that are occurring across all the bursts can be identified. The frequent itemsets, e.g., data sets or variables, can be considered a failure fingerprint.

As another example, consider burst 1 has (m1, m5 and m10), burst 2 has (m1, m5, M20), burst 3 has (m2, m3, m4), and burst 4 has (m2, m5, m4) times series data with reconstruction errors (e.g., high reconstruction errors as determined based on a threshold). Each burst can be treated as a market basket and frequent itemsets across multiple bursts can be identified. In this example, itemset (m1, m5) can be identified as a frequent itemset, for example, because that set occurred in 2 out of 4 bursts. Itemset (m2, m4) can also be identified as a frequent itemset because that itemset also occurred in 2 out of 4 bursts. In this example, no other patterns occurred as frequently as those 2 itemsets. For instance, each burst is a market basket, and using FP-growth algorithm, common patterns can be identified, for example, itemsets (m1, m5) and (m2, m4). Itemset (m1, m5) can be identified as failure fingerprint 1 and itemset (m2, m4) can be identified as failure fingerprint 2. These are the identified fingerprints and once identified, an automatic action can be taken.

In an embodiment, the autoencoders 404 that are trained all have the same structures but initialized with different random seeds, such that one autoencoder on the same data may learn on set of weights while another autoencoder may learn a different set of weights. For example, the autoencoders may have the same size input layers, the same size hidden layers and the same size output layers. In an embodiment, a hidden layer of an autoencoder has smaller number of nodes than the nodes of its input layer.

In an embodiment, with ensemble of autoencoders, multiple dimensions in time series, e.g., top-k dimensions, can be obtained, which have reconstruction error. Fingerprint modality shows a collection of dimensions that have co-occurring reconstruction errors, e.g., a burst of reconstruction errors co-occurring in time, or window or period of time. A burst is segmented by time, a segmentation based on time. Burst can be of different lengths, unequal length. A segment has one burst of reconstruction error, e.g., high reconstruction error. Within a burst, there are dimensions with high reconstruction error. For example, in the above example, 4 segments or 4 bursts are identified and across these bursts, two common patterns (referred to as failure fingerprint) are identified.

Considering that there can be N dimensions, a burst segmentation can have from 1 to N number of dimensions. Top k number of dimensions can be selected. In an embodiment, a percentage of reconstruction error can be selected such as 90%, 95%, of the total reconstruction. In an embodiment, in each burst, the dimensions that cover k percentage of total reconstruction error can be identified, for example, where k can be configured, for example, by a subject matter expert.

Figure 5:
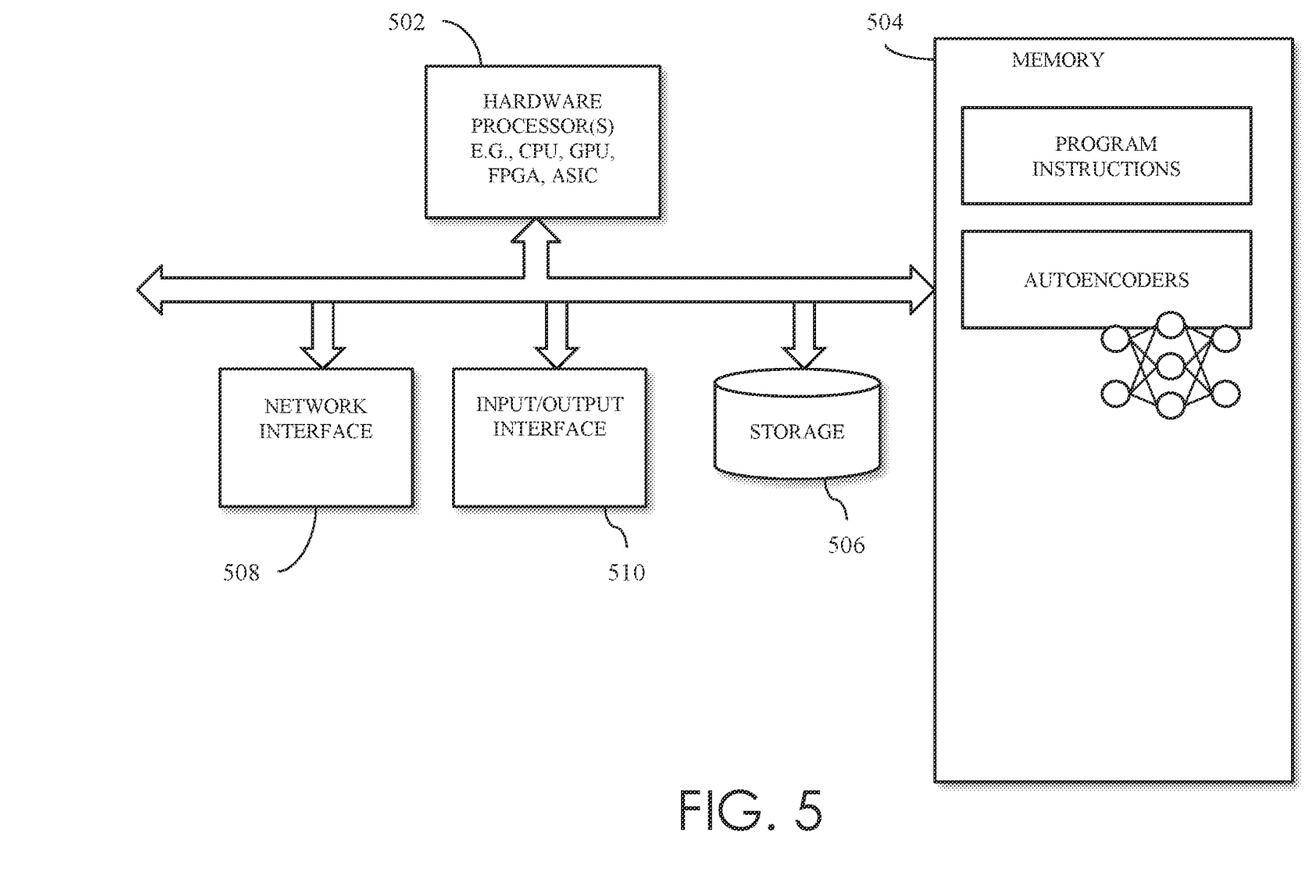
FIG. 5 is a diagram showing components of a system in one embodiment that can identify multivariate spatiotemporal patterns.

FIG. 5 is a diagram showing components of a system in one embodiment that can identify multivariate spatiotemporal patterns. One or more hardware processors 502 such as a central processing unit (CPU), a graphic process unit (GPU), and/or a Field Programmable Gate Array (FPGA), an application specific integrated circuit (ASIC), and/or another processor, may be coupled with a memory device 504, and build and/or train an ensemble of autoencoders, e.g., neural networks. A memory device 504 may include random access memory (RAM), read-only memory (ROM) or another memory device, and may store data and/or processor instructions for implementing various functionalities associated with the methods and/or systems described herein. One or more processors 502 may execute computer instructions stored in memory 504 or received from another computer device or medium. A memory device 504 may, for example, store instructions and/or data for functioning of one or more hardware processors 502, and may include an operating system and other program of instructions and/or data. One or more hardware processors 502 may train based on ground truth data, an ensemble of autoencoder models using different seeds. One or more hardware processors 502 may run the trained ensemble of autoencoder models on new time series data to generate a prediction associated with the new time series data. The new time series data can include multiple dimensions per time step. For instance, the new times series data is multivariate time series data. One or more hardware processors 502 may determine reconstruction errors between the prediction and the ground truth data. One or more hardware processors 502 may select dimensions having highest reconstruction errors among the multiple dimensions based on a threshold. One or more hardware processors 502 may segment the prediction based on bursts of the reconstruction errors over time, where temporal segments can be obtained. One or more hardware processors 502 may identify at least one common pattern including a set of dimensions among the selected dimensions across the temporal segments. At least one common pattern can represent a failure fingerprint. Input data may be stored in a storage device 506 or received via a network interface 508 from a remote device, and may be temporarily loaded into a memory device 504 for building and/or running the autoencoders. The learned or trained ensemble of autoencoders may be stored on a memory device 504, for example, for running by one or more hardware processors 502. One or more hardware processors 502 may be coupled with interface devices such as a network interface 508 for communicating with remote systems, for example, via a network, and an input/output interface 510 for communicating with input and/or output devices such as a keyboard, mouse, display, and/or others.

Figure 6:
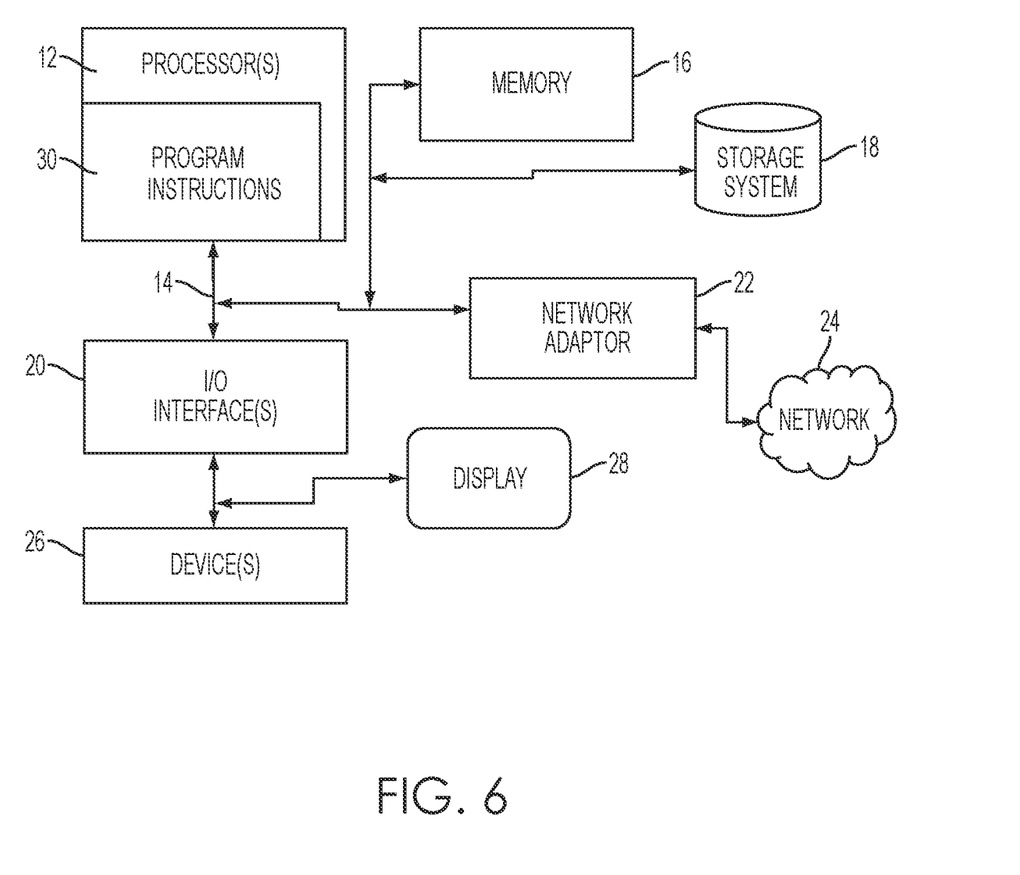
FIG. 6 illustrates a schematic of an example computer or processing system that may implement a system in one embodiment.

FIG. 6 illustrates a schematic of an example computer or processing system that may implement a system in one embodiment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 6 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being run by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
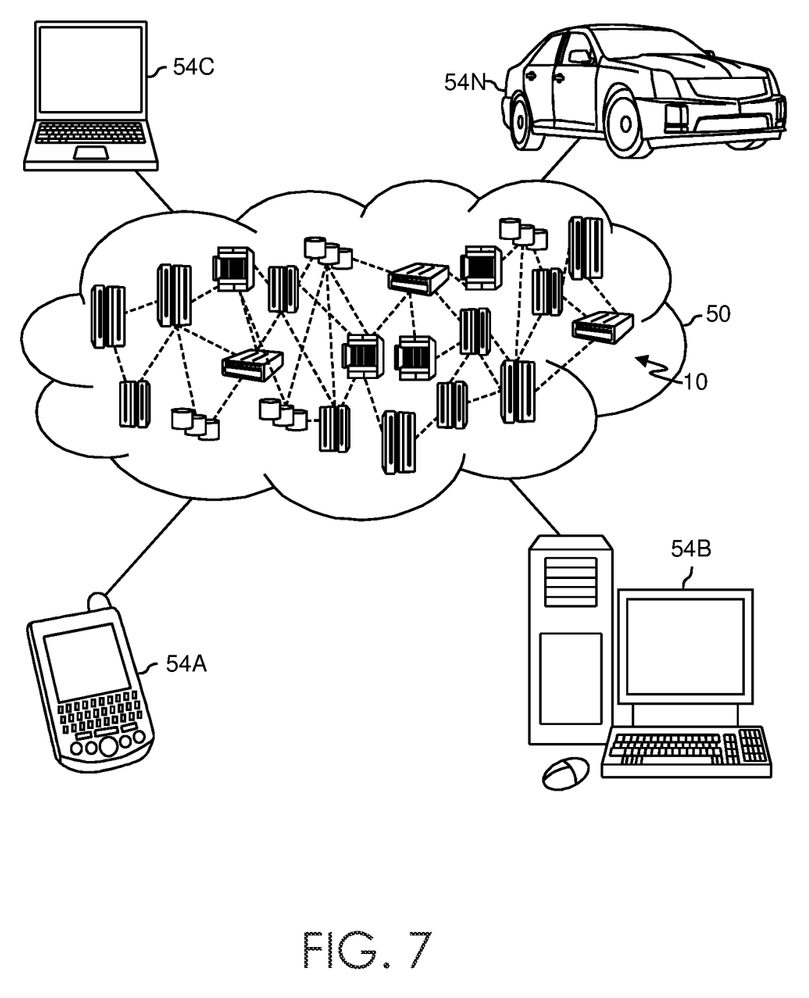
FIG. 7 illustrates a cloud computing environment in one embodiment.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
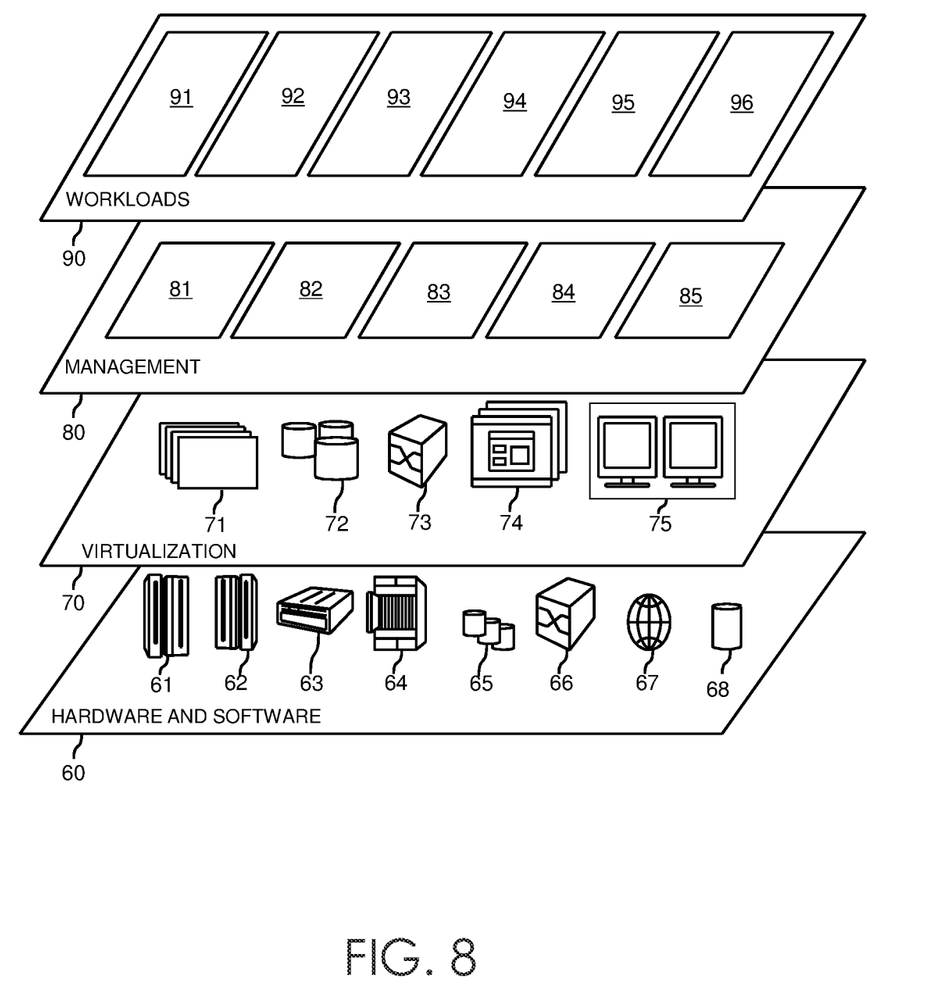
FIG. 8 illustrates a set of functional abstraction layers provided by cloud computing environment in one embodiment of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and multivariate time series processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, run concurrently, substantially concurrently, in a partially or wholly temporally overlapping manner, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
   training an ensemble of autoencoder models using different seeds;
   running the trained ensemble of autoencoder models on new time series data to generate a prediction associated with the new time series data, the new time series data including multiple dimensions per time step;
   determining reconstruction errors for the prediction;
   selecting dimensions having highest reconstruction errors among the multiple dimensions based on a threshold;
   segmenting the prediction based on bursts of the reconstruction errors over time, wherein temporal segments are obtained;
   identifying at least one common pattern including a set of dimensions among the selected dimensions across the temporal segments, said least one common pattern representing a failure fingerprint.

2. The computer-implemented method of claim 1, wherein a root cause is provided based on the failure fingerprint.

3. The computer-implemented method of claim 1, wherein the selecting dimensions having highest reconstruction errors among the multiple dimensions based on a threshold, includes selecting dimensions having highest threshold percentage of reconstruction errors.

4. The computer-implemented method of claim 1, wherein the autoencoder models have same network architecture.

5. The computer-implemented method of claim 1, further including automatically restarting a router based on the identified failure fingerprint.

6. The computer-implemented method of claim 1, further including automatically adjusting heap space of a virtual machine based on the identified failure fingerprint.

7. A system comprising:
   a processor;
   a memory device coupled with the processor;
   the processor configured to at least:
   train an ensemble of autoencoder models using different seeds;
   run the trained ensemble of autoencoder models on new time series data to generate a prediction associated with the new time series data, the new time series data including multiple dimensions per time step;
   determine reconstruction errors for the prediction;
   select dimensions having highest reconstruction errors among the multiple dimensions based on a threshold;
   segment the prediction based on bursts of the reconstruction errors over time, wherein temporal segments are obtained;
   identify at least one common pattern including a set of dimensions among the selected dimensions across the temporal segments, said least one common pattern representing a failure fingerprint.

8. The system of claim 7, wherein a root cause is provided based on the failure fingerprint.

9. The system of claim 7, wherein the processor is configured to select dimensions having highest threshold percentage of reconstruction errors in selecting dimensions having highest reconstruction errors among the multiple dimensions based on a threshold.

10. The system of claim 7, wherein the autoencoder models have same network architecture.

11. The system of claim 7, wherein the processor is further configured to automatically restart a router based on the identified failure fingerprint.

12. The system of claim 7, wherein the processor is further configured to automatically adjust heap space of a virtual machine, based on the identified failure fingerprint.

13. A computer program product comprising a computer readable storage medium having program instructions embodied therewith, the program instructions readable by a device to cause the device to:
   train an ensemble of autoencoder models using different seeds;
   run the trained ensemble of autoencoder models on new time series data to generate a prediction associated with the new time series data, the new time series data including multiple dimensions per time step;
   determine reconstruction errors for the prediction;
   select dimensions having highest reconstruction errors among the multiple dimensions based on a threshold;
   segment the prediction based on bursts of the reconstruction errors over time, wherein temporal segments are obtained;
   identify at least one common pattern including a set of dimensions among the selected dimensions across the temporal segments, said least one common pattern representing a failure fingerprint.

14. The computer program product of claim 13, wherein a root cause is provided based on the failure fingerprint.

15. The computer program product of claim 13, wherein the device is caused to select dimensions having highest threshold percentage of reconstruction errors in selecting dimensions having highest reconstruction errors among the multiple dimensions based on a threshold.

16. The computer program product of claim 13, wherein the autoencoder models have same network architecture.

17. The computer program product of claim 13, wherein the device is further caused to automatically restart a router based on the identified failure fingerprint.

18. The computer program product of claim 13, wherein the device is further caused to automatically adjust heap space of a virtual machine, based on the identified failure fingerprint.

19. The computer program product of claim 13, wherein the new time series data includes sensor data observed in manufacturing equipment.

20. The computer program product of claim 13, wherein the new time series data includes performance data associated with computer components.

* * * * *